United States Patent [19]

Goldsberry

[11] Patent Number: 4,824,447
[45] Date of Patent: Apr. 25, 1989

[54] ENHANCED OIL RECOVERY SYSTEM

[75] Inventor: Fred L. Goldsberry, Spring, Tex.

[73] Assignee: The United States of America as represented by the United States Department of Energy, Washington, D.C.

[21] Appl. No.: 947,791

[22] Filed: Dec. 30, 1986

[51] Int. Cl.[4] .............................................. B01D 53/22
[52] U.S. Cl. ........................................ 55/158; 55/169; 55/175; 55/195; 55/208; 55/269; 166/268
[58] Field of Search ................. 55/158, 159, 169, 174, 55/175, 189, 195, 208, 267–269; 166/268

[56] References Cited

U.S. PATENT DOCUMENTS

| | | | |
|---|---|---|---|
| 2,875,833 | 3/1959 | Martin | 166/9 |
| 2,887,174 | 5/1959 | Ray | 55/169 |
| 3,137,344 | 6/1964 | Wiemer | 166/9 |
| 3,418,252 | 12/1968 | Francis, Jr. | 55/174 X |
| 4,060,988 | 12/1977 | Arnold | 60/641 |
| 4,112,745 | 9/1978 | McCabe et al. | 60/641 |
| 4,171,017 | 10/1979 | Klass | 55/158 X |
| 4,183,406 | 1/1980 | Lundberg et al. | 166/295 |
| 4,262,747 | 4/1981 | Elliott et al. | 166/305 R |
| 4,305,463 | 12/1981 | Zakiewicz | 106/245 |
| 4,331,202 | 5/1982 | Kalina | 166/245 |
| 4,376,462 | 3/1983 | Elliott et al. | 166/267 |
| 4,377,208 | 3/1983 | Elliott et al. | 166/265 |
| 4,378,047 | 3/1983 | Elliott et al. | 166/68 |
| 4,484,446 | 11/1984 | Goldsberry | 60/647 |
| 4,619,769 | 10/1986 | Gritters et al. | 210/498 X |
| 4,699,719 | 10/1987 | Finley | 55/169 X |

Primary Examiner—Robert Spitzer
Attorney, Agent, or Firm—L. E. Carnahan; Roger S. Gaither; Judson R. Hightower

[57] ABSTRACT

All energy resources available from a geopressured geothermal reservoir are used for the production of pipeline quality gas using a high pressure separator/heat exchanger and a membrane separator, and recovering waste gas from both the membrane separator and a low pressure separator in tandem with the high pressure separator for use in enhanced oil recovery, or in powering a gas engine and turbine set. Liquid hydrocarbons are skimmed off the top of geothermal brine in the low pressure separator. High pressure brine from the geothermal well is used to drive a turbine/generator set before recovering waste gas in the first separator. Another turbine/generator set is provided in a supercritical binary power plant that uses propane as a working fluid in a closed cycle, and uses exhaust heat from the combustion engine and geothermal energy of the brine in the separator/heat exchanger to heat the propane.

6 Claims, 2 Drawing Sheets

ENHANCED OIL RECOVERY SYSTEM

BACKGROUND OF THE INVENTION

This invention relates generally to geothermal power control systems and more particularly to a process encompassing the utilization of all energy resources available from a geopressured geothermal reservoir for the production of electric power and pipeline quality gas and the production and injection of engineered fluids for water and/or miscible flooding of depleted petroleum reservoirs.

Economic production of oil from an underground formation becomes impossible when the reservoir pressure drops below a certain level. When that occurs, it has been the practice to employ one or more methods of secondary and tertiary oil recovery. These methods require a new driving force to displace oil from the underground formations toward adjacent production wells in the same field.

Secondary and tertiary oil recovery techniques have centered upon engineered floods of natural gas, $CO_2$, water, and polymer aqueous solutions for the purpose of (1) physically changing the properties of oil (density, viscosity, surface tension and wetting characteristics), and (2) uniformly sweeping it through the reservoir. Compared with water flooding, miscible flooding is the more sophisticated technique for oil displacement. The oil is diluted with natural gas, $CO_2$ or other light hydrocarbons in order to reduce the viscosity and to increase the mobility of the oil. The relatively more expensive gas is usually followed by a mixture of water and surfactant (detergent, ammonia, etc.). A diffusion front (oil saturation bank) is caused by the first soluble material and formed near the injection well. Remaining oil droplets are mobilized by the surfactant and water to complete the oil bank that sweeps the remaining reservoir oil through the rock to production wells. At the end, polymerized water (micellar polymer) with high viscosity, and the ability to maintain a stable and uniform flood front, is pumped into the injection well as a sweep or displacement mechanism. Performance of the system will increase when all these fluids are heated because the miscible phase is more soluble, the fluid viscosities are reduced and the surfactant has better cleaning or wetting properties.

Instead of pumping the fluids to displace oil from reservoir rocks, it is more economical to use the hydraulic energy available in a geopressured aquifer. These concepts have centered upon using hot brine as a motive force behind the engineered fluids. Geopressured wells of commercial productivity (i.e., 10,000–40,000 BPD for ten years) are not likely to be found in strata productive of oil and gas. These strata are usually highly faulted producing small structural traps. In productive areas, wells are often drilled to great depths in search of additional oil and gas only to locate water saturated sands. That happens more often than not. But during the life of the productive field one can expect a deeper test and it will almost certainly reveal some geopressured brine zone that has more than enough fluid under pressure to sweep an existing pressure depleted hydrocarbon field.

In most cases, artificial floods are composed of engineered fluids of specified compositions and injected at controlled rates. The objective is to design a general process for enhanced oil recovery utilizing the hydraulic and thermal energy of geopressured geothermal brine resources as a means for offsetting the cost of the water flood. The invention described in U.S. Pat. No. 4,484,446 by the present inventor was made in satisfaction of the objective of converting thermal and hydraulic energy to electric power in the most thermally efficient manner possible.

Another objective for the exploitation of geopressured geothermal energy resource fluids is to be seen in the shortage of natural gas in recent years. Brine is typically saturated with natural gas in quantities of from thirty to fifty standard cubic feet per barrel (5.34–8.91 $m^3$ gas/$m^3$ brine) at 250° F. to 450° F. (395 K to 505 K). The large extent of that resource has prompted various estimates of recoverable gas reserves that could extend the U.S. reserve life index from five to two hundred years. The present invention addresses the need to recover fluids for gas and water floods, and to recover natural gas, as well as the utilization of hydraulic and thermal energy.

SUMMARY OF THE INVENTION

In accordance with the present invention, apparatus for the production of electric power and pipeline quality gas, and for the production and injection of engineered fluids for miscible flooding of depleted petroleum reservoirs from a geopressured geothermal reservoir, is comprised of two gas separator vessels connected in tandem to a geopressured brine resource for separating gas from the brine by exsolution. The first vessel is operated at high pressure and the second vessel is operated at low pressure.

To accomplish that gas separation in the first vessel, means are provided for limiting brine level in the first vessel such that a broad surface level is exposed. A similar means is provided in the second low pressure separator, but in the second separator there is associated with the level limiting means a weir which will drain dissociated petroleum condensate from a surface layer quality propane. A second means are provided for detecting the level of brine for maintaining the brine level, and to drain any excess brine into a disposal well.

A membrane separator is connected to receive gas from the high pressure separator. Its function is to separate quality gas from the gas received from the first separator, and emit low pressure waste gas having high $CO_2$ content The waste gas from the membrane separator is combined with gas separated from the second low pressure separator.

A turbine generator set is provided to generate electrical power from the hydraulic and thermal energy of the brine resource. The set comprises means for driving the turbine with the brine, which in turn drives the generator, and means for regulating the brine back pressure.

Also included is a power cycle comprised of a turbine generator set using propane as a working fluid in a closed loop consisting of a condenser, a feed pump with input and output check valves, and a heat exchanger integrated in the high pressure gas separator vessel for transmitting heat from the brine to the working fluid. An additional heat exchanger is provided with means for transmitting heat from internal combustion engine exhaust gases to the working fluid before it drives the turbine. The combustion engine is provided with valve means for receiving a supply of waste gas from the membrane separator and the second, low pressure gas separator.

All or any part of the above may be combined with means for selectively connecting either the high pressure brine, from the well head, or the low pressure brine, from the high pressure gas separator, and polymer and surfactant additions for injection into a well for enhanced oil recovery by water and/or miscible flooding of a depleted oil reservoir.

DESCRIPTION OF A PREFERRED EMBODIMENT

Figure 1:
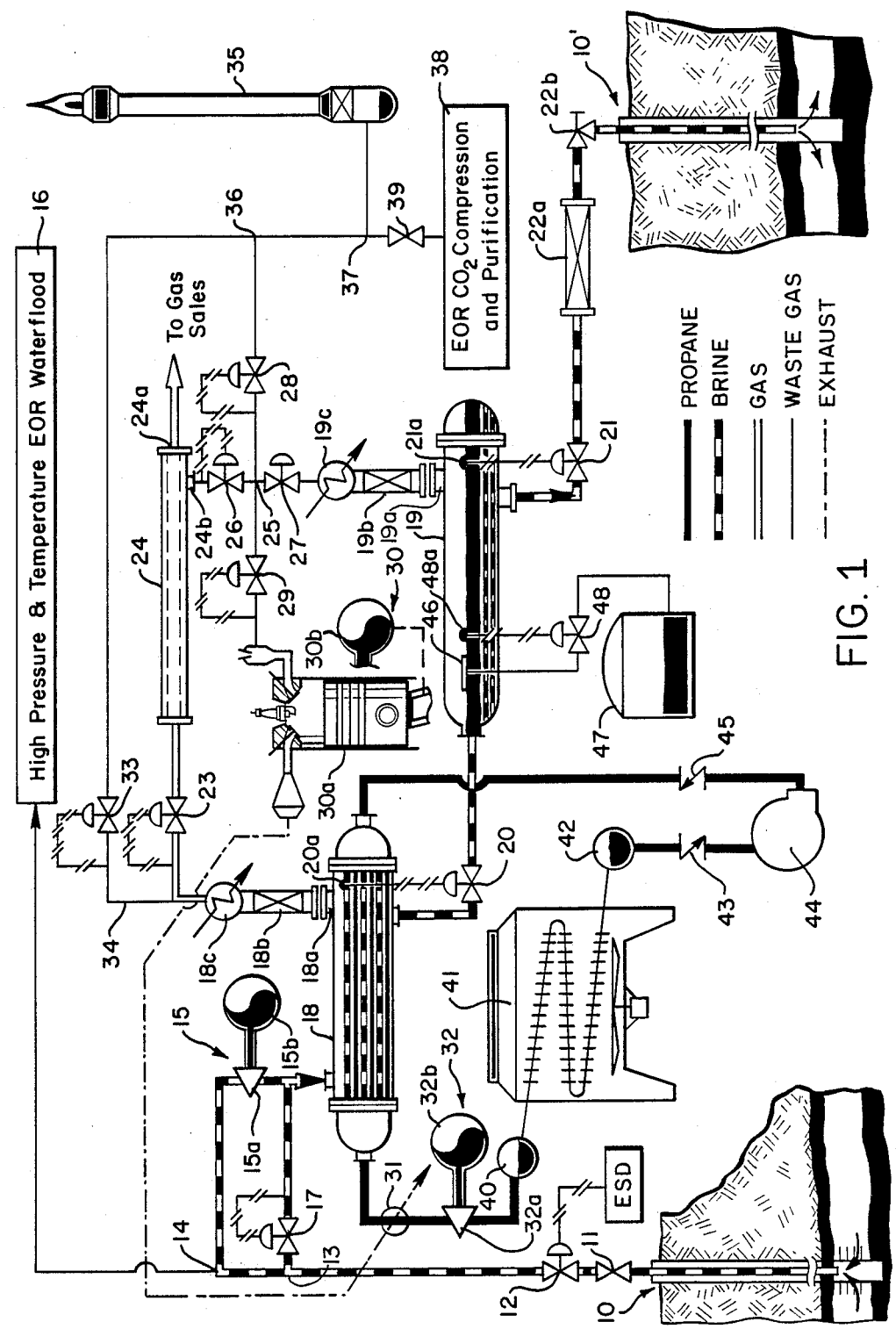
FIG. 1 is a schematic diagram of a preferred embodiment of a combined geopressured geothermal power production process which may be incorporated in an enhanced oil recovery (EOR) system.

As previously pointed out, this invention addresses a need for the production of electric power and pipeline quality gas for sale and the production and injection of engineered fluids for water and/or miscible flooding of depleted oil reservoirs from a geopressured geothermal reservoir. Referring to FIG. 1, high pressure hot brine is produced by a geopressured geothermal production well 10. After passing a master check valve 11, an emergency shutdown (ESD) control valve 12, a tee at 13 and a tee at 14, brine is fed to a turbine/generator set 15 comprised of an expansion turbine 15a that drives a generator 15b, thus using hydraulic energy of the brine before extracting other energies from the brine. Some of the brine out of the tee at 14 can be used for high pressure and high temperature waterflood with or without engineered fluids for enhanced oil recovery (EOR), as indicated by a block 16. The low pressure brine from the hydraulic turbine/generator set 15 regulated by a back pressure reduction valve 17 feeds a separator/heat exchange unit 18 and separator 19 connected in tandem by a valve 20 controlled by a brine level sensor 20a, such as a float switch. These separators 18 and 19 will separate quality gas for sale from condensate. The separator/heat exchange unit 18 combines the function of a separator and of a heat exchanger in one unit by flooding the vessel of the separator 18 with the hot brine to a level less than 50%, thus allowing for exsolution of natural gas, and passing propane (a working fluid) through tubes in the vessel for heat exchange from the hot brine and natural gas to the propane. A pressure reduction is imposed on the brine in both the separators 18 and 19, thereby allowing separation of gas from the brine by exsolution.

The inlet pressure for the high pressure separator/heat exchange unit 18, operating above the pressure level of a gas pipeline, is regulated to a desired level by the expanding characteristic of the turbine 15a and the back pressure reduction valve 17 which senses the actual back pressure of the turbine. If the required pressure at the inlet of the separator/heat exchange unit 18 is higher than the actual back pressure of the turbine 15a, a by-pass to the tee at 13 is opened by the back pressure reduction valve 17. This enables an expansion turbine 15a to work in a most efficient way.

The control valve 20 responds to the brine level sensor 20a to maintain the brine level in the high pressure separator/heat exchange unit 18 below a half full level, and pass the excess brine into the low pressure separator 19. In both separators, the gas in the brine exsolves into a lower pressure of the separator vessel. The low pressure separator 19 has a lower pressure level imposed on the brine than the high pressure separator/heat exchanger unit 18. Nevertheless, this pressure level is higher than that of a disposal well 10', so that the brine is forced to drain. For extreme cases, when the disposal well pressure is higher than the pressure of the low pressure separator 19, a pump may be used. The brine level in the low pressure separator 19 is maintained by a valve 21 controlled by a brine level sensor 21a, such as a float switch. After this valve, the brine passes to the disposal well through surge box 22a and a master control valve 22b.

As noted above, gas is separated in the high pressure separator/heat exchange unit 18 and the low pressure separator 19 by exsolution. The gas pressure at the outlet 18a of the high pressure separator/heat exchange unit 18 is above the high pressure of commercial pipelines for quality gas. A flue 18b and damper 18c connect the outlet 18a to a pressure control valve 23 which regulates the gas pressure for a semi-permeable membrane separator 24. In this membrane separator, the gas is separated into high pressure pipeline quality gas at an outlet 24a connected to a gas pipeline and low pressure waste gas with approximately 25% $CO_2$ content at an outlet 24b. The low pressure separator 19 produces low pressure gas with approximately 50% $CO_2$ content at an outlet 19a.

A four-way connection at 25 connects three pressure control valves 26, 27, 28 and a pressure reduction valve 29, which is closed under normal conditions. Pressure control valve 26 is fed by the low pressure waste gas of the membrane separator 24 and regulates the outlet pressure to the same balanced outlet level of pressure control valve 27 which is fed by the low pressure, high $CO_2$ gas from the separator 19 through a flue 19b and damper 19c. In the four-way connection at 25, both gases with high $CO_2$ content are combined into what is referred to hereinafter as flash gas. Pressure reduction valve 29 adjusts the flash gas pressure to the level required by an internal combustion gas engine 30a (internal combustion engine) which drives an electric generator 30b of a gas engine/generator set 30. The hot exhaust of combustion in the engine 30a is directed to a heat exchanger 31 of a supercritical binary power plant 32 comprised of a turbine 32a and generator 32b.

It should be noted that there is a pressure control valve 33 in a line 34 which bypasses gas from the separator 18 to an emergency flare 35 to which the pressure control valve 28 is also connected through a tee at 36. In normal operation, the bypassed gas flow to the emergency flare 35 is blocked by the pressure control valve 33. If the gas pressure to the membrane separator 24 is too high, the pressure control valve 33 opens the bypass to the emergency flare 35 which includes a master shut-off valve. The pressure control valve 28, sensing the pressure of the flash gas at the four-way connection at 25, is connected to the emergency flare by the tee at 36. A tee at 37 in the emergency flare pipeline is used to connect an enhanced oil recovery $CO_2$ compression and purification unit 38 as an option to this system while the emergency flare 35 is shut off. A check valve 39 prevents any back flow from the unit 38.

The supercritical binary power plant 32 composed of a turbine 32a and generator 32b uses the geothermal energy of the brine in a supercritical power cycle and the combustion heat of the gas engine 30a in a supercritical power cycle. Propane, the working fluid of the supercritical power cycle is heated in counterflow circulation by the brine in the separator/heat exchange unit 18 and by the hot exhaust of the gas engine 30a in a heat exchanger 31. In the expansion turbine 32a of the generator 32b, the working fluid expands and is directed to a header 40. From there the low pressure vapor exhaust is fed to an air cooled condenser 41 where the vapor condenses and flows as liquid propane to an accumulator 42, which is the liquid reservoir of the super critical power cycle. Through a check valve 43, the liquid propane enters a process feed pump 44, boosting the pressure of the working fluid in the power cycle. This power cycle is closed through another check valve 45 between the separator/heat exchange unit 18 and the process feed pump 44.

In the low pressure separator 19, quality gas separates by exsolution, while liquid hydrocarbons (oil or condensate) rise and float on the brine. Consequently, liquid hydrocarbons can be skimmed off the top of the brine in the separator 19 using a weir 46 and stored in a vessel 47. A level control valve 48 responsive to a level sensor (float switch) 48a will control the level of the liquid hydrocarbons to assure that the weir 46 takes liquid hydrocarbons only from near the top of the liquid hydrocarbons, i.e., the level of the liquid hydrocarbons is controlled to just the working level of the weir 46.

Figure 2:
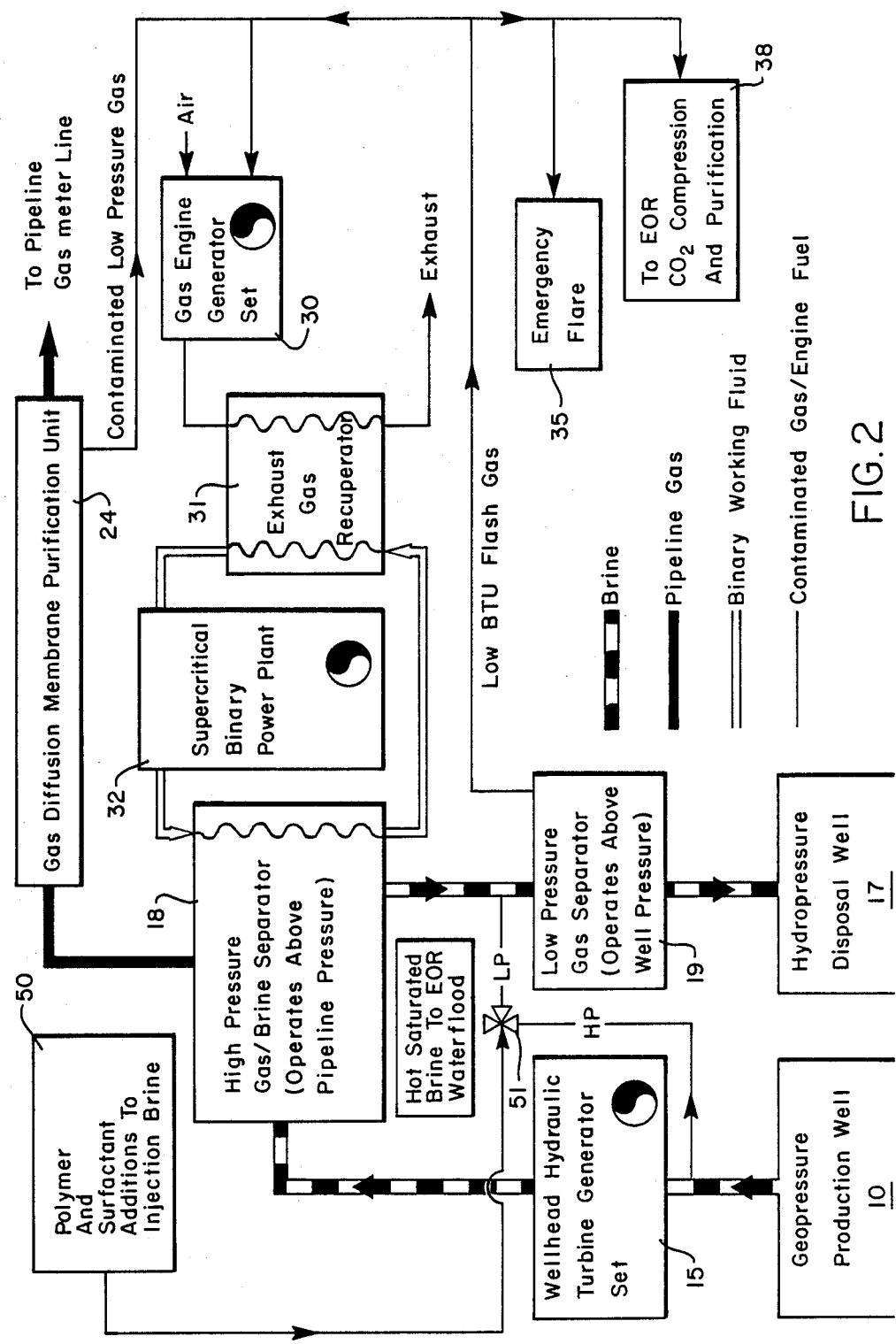
FIG. 2 is a functional block diagram illustrating the general organization of a combined geopressured geothermal power production system shown in FIG. 1 incorporated in an enhanced oil recovery (EOR) system.

Referring now to FIG. 2, it summarizes in schematic diagram of a more general functional-block form the combined geopressured geothermal power production process of FIG. 1 which utilizes virtually all of the energy available from a geopressured production well 10. In order that this diagram be readily understood, the same reference numerals are used for functional blocks that relate to those used for components in FIG. 1.

The first energy conversion system is a wellhead hydraulic turbine generator set 15. From there, the brine from the well passes through a high pressure gas/brine separator 18 operating above the gas pipeline pressure. The brine effluent from the separator 18 passes through a low pressure gas separator 19, and from there into a disposal well 17. The low quality gas from this separator will normally be directed to an emergency flare 35, or to an EOR $CO_2$ compression and purification system 38 for further refinement. It may also be directed to a gas engine generator set 30. The exhaust from the generator set 30 is directed through a heat exchanger 31 to add energy to the working fluid (propane) of a supercritical binary power plant 32.

When this combined geopressured geothermal power production process is at or near an oil field, it may be used to provide geopressured geothermal energy resource fluids for enhanced oil recovery. Fluids required for flooding a petroleum reservoir are required to be produced in specified compositions and injected at controlled rates. The process described herein allows the production of those fluids along with energy by-products that may be sold to increase income and/or for utilization as an energy source for enhanced oil recovery (EOR) activities. For high rate production processes, the diagram in FIG. 2 shows the modifications to a combined geopressured geothermal power production process that can be made to furnish selected fluids for flooding purposes on a commercial scale geopressured well. In accordance with this aspect of the invention, polymer and surfactant additions to injection brine are proposed as indicated by a block 50 in FIG. 2, and combined in a three-way check valve with high pressure (HP) brine directly from the geopressure production well and low pressure (LP) effluent brine from the high pressure separator 18.

Hypothetical Example

Assume a reservoir productive of oil and gas at a depth of 8,000 ft. in a small (200 acre) fault block. Also assume a test well drilled after twenty years of production to a depth of 18,000 ft. to test a lower horizon for natural gas. The deep hole is plugged back at the bottom of an intermediate casing at 13 000 ft. This intermediate casing intersects an overpressured sand at 12,750 ft. According to electric logs and drilling records it is expected to be productive of brine.

It has been established by research efforts that this brine will be saturated with natural gas (30 SCF/BBL) of which 5 to 10% will be $CO_2$. The operator also has a production well that has watered out and that may be used as a salt water disposal well. It is known to be capable of receiving 2,000 BPD without any back pressure at the surface.

The operator can now begin (1) a pressure maintenance program, (2) a five spot pattern injection operation, or (3) a $CO_2$ injection and polymer flood in the watered out wells to aid in sweeping the remainder of the oil from the reservoir.

The operator can then take these actions:
(1) Reenter the abandoned deep well, run a production packer on a string of tubing. The well is then perforated and tested for productivity into a portable tank.
(2) Lay a small flow line to the disposal well for proper (legal) disposal of excess or energy depleted brine.
(3) Install the geopressure hybrid energy production facility to be described herein and connect the proper gas sales and/or gas/water injection lines to designated wells.
(4) As prudent engineering of the $CO_2$/water flood is pursued, the fluids produced for injection are varied to meet the requirements of the job.

The material balance for such a system can be worked out readily on a 1,000 BBL basis. Assume a brine with 30 SCF/BBL of recoverable gas which is 7% $CO_2$. Approximately 24 SCF/BBL is recovered on the high pressure side at 1,000 psia. The membrane gas loss will be approximately 4 SCF with an additional 4 SCF recovered from the low pressure flash at 200 psi.

|  |  | ACTUAL VOLUME |
|---|---|---|
| FLUID: | 1 BBL | 5.615 $FT^3$ |
| GAS: | 8 SCF |  |
|  | @ 200 PSIA | .588 $FT^3$ |
|  | @ 1,000 | .1176 $FT^3$ |

An EOR $CO_2$ compression unit requires approximately 10.5% of the brine flow to compress the gas back to pipeline pressure. The low pressure high $CO_2$ gas production from this system can be recompressed using the mechanical energy in 10% of the brine. The approximately daily volumes of gas in this case will be:
20 MCFD — Saleable Fuel Gas or Injection
10 MCFD — Injection or Sweep Gas
Actual swept volume in 24 hours will be 588 $FT^3$ per thousand barrels. Pump fluid required is 105 BBL per thousand produced. The majority of the hydraulic energy in the brine remains available for water flood or driving a hydraulic turbine.

Although particular embodiments of the invention have been described and illustrated herein, it is recognized that modifications and equivalents in the apparatus and process set forth will occur to those skilled in the art without departing from the spirit and scope of the invention. Consequently, it is intended that the following claims should be interpreted to cover such modifications and equivalents.

What is claimed is:

1. Apparatus for the production of electric power utilizing all energy resources available from a geopressured geothermal reservoir comprising
    two gas separator vessels connected in tandem to a brine resource for separating gas from said brine by exsolution, the first at high pressure and the second at low pressure,
    means for limiting brine level for broad surface level exposure into said high pressure gas separator vessel and said low pressure gas separator vessel,
    means for detection, removal and collection of hydrocarbon liquid of low specific gravity in said second low pressure separator,
    a pipeline for disposing of residual liquid out of said low pressure separator vessel,
    a membrane separator connected to receive gas from said high pressure separator for separating quality gas from gas separated out of said brine in said high pressure separator vessel, and emitting low pressure waste gas having high $CO_2$ content, and
    means for combining said gas having high $CO_2$ content from said membrane separator with gas separated from liquid in said low pressure separator.

2. Apparatus as defined in claim 1 in combination with a turbine generator set for generating electric power using the hydraulic and thermal energy of said brine resource comprising means for driving said turbine of said set with said brine and means for regulating the brine back pressure.

3. Apparatus as defined in claim 1 including a power cycle with a turbine generator set including a working fluid in a closed loop consisting of a condenser, a feed pump with input and output check valves, a heat exchanger integrated in said high pressure gas separator vessel with means for transmitting heat from said brine to said working fluid.

4. Apparatus as defined in claim 3 including a heat exchanger with means for transmitting heat from a hot gas stream to said working fluid before it drives said turbine, and
    a combustion engine with valve means for supplying thereto said combined $CO_2$-rich gas, and
    a conduit for exhaust gases from said combustion engine to flow to the said heat exchanger of said power cycle.

5. Apparatus for the production and injection of engineered fluids for water/miscible flooding of depleted petroleum reservoirs utilizing all energy resources available from a geopressured geothermal reservoir, comprising
    two gas separator vessels connected in tandem to brine resource for separating gas from said brine by exsolution, the first at high pressure and the second at low pressure,
    means for limiting brine level for broad surface level exposure into said high pressure gas separator vessel and said low pressure gas separator vessel,
    means for detection, removal and collection of hydrocarbon liquid of low specific gravity in said second low pressure separator,
    a pipeline for disposing of residual liquid out of said low pressure separator vessel,
    means for selectively connecting either said high pressure brine or said low pressure brine and polymer and surfactant additions to a pipeline for injection of a mixture into a well for enhanced oil recovery by water/miscible flooding of a depleted oil reservoir,
    a membrane separator connected to receive gas from said high pressure separator for separating quality gas from gas separated out of said brine in said high pressure separator vessel, and emitting low pressure waste gas having high $CO_2$ content,
    means for combining said gas having high $CO_2$ content from said membrane separator with gas separated from liquid in said low pressure separator, and
    means to connect said gas having high $CO_2$ content from said membrane separator or said gas separated from liquid in said low pressure separator or said combined gas to said pipeline for injection of a mixture into said well for enhanced oil recovery by water/miscible flooding of a depleted oil reservoir.

6. Apparatus for utilization of all energy resources available from a geopressured geothermal reservoir for the production of pipeline quality gas comprising
    two gas separator vessels connected in tandem to a brine resource for separating gas from said brine by exsolution, the first at high pressure and the second at low pressure,
    means for limiting brine level for broad surface level exposure into said high pressure gas separator vessel and said low pressure gas separator vessel,
    means for detection, removal and collection of hydrocarbon liquid of low specific gravity in said second low pressure separator,
    a pipeline for disposing of residual liquid out of said low pressure separator vessel,
    a membrane separator connected to receive gas from said high pressure separator for separating quality gas from gas separated out of said brine in said high pressure separator vessel, and emitting low pressure waste gas having high $CO_2$ content, and
    means for diverting said quality gas from gas separated out of said brine in said high pressure separator vessel to a quality gas pipeline.

* * * * *